(12) United States Patent
Olsen et al.

(10) Patent No.: US 8,430,619 B2
(45) Date of Patent: Apr. 30, 2013

(54) CONCRETE AND MASONRY SCREW ANCHOR

(75) Inventors: Jacob Olsen, Roselle, IL (US); Paul Gaudron, Stratford, CT (US)

(73) Assignee: Black & Decker Inc., Newark, DE (US)

( * ) Notice: Subject to any disclaimer, the term of this patent is extended or adjusted under 35 U.S.C. 154(b) by 590 days.

(21) Appl. No.: 12/689,354

(22) Filed: Jan. 19, 2010

(65) Prior Publication Data

US 2011/0176889 A1    Jul. 21, 2011

(51) Int. Cl.
*F16B 35/04* (2006.01)
(52) U.S. Cl.
USPC .......................................................... 411/412
(58) Field of Classification Search .......... 411/411–413, 411/415, 424; 72/88; 470/10
See application file for complete search history.

(56) References Cited

U.S. PATENT DOCUMENTS

| | | | | |
|---|---|---|---|---|
| 3,207,023 A * | 9/1965 | Knohl | | 411/387.3 |
| RE28,111 E * | 8/1974 | Laverty | | 411/412 |
| 3,861,269 A * | 1/1975 | Laverty | | 411/413 |
| 4,439,077 A * | 3/1984 | Godsted | | 411/411 |
| 5,061,135 A * | 10/1991 | Pritchard | | 411/411 |
| 5,061,136 A * | 10/1991 | Dixon et al. | | 411/412 |
| 5,294,227 A * | 3/1994 | Forster et al. | | 411/386 |
| 6,394,726 B1 * | 5/2002 | Garvick | | 411/414 |
| 6,494,655 B1 * | 12/2002 | Pritchard | | 411/399 |
| 6,702,537 B2 * | 3/2004 | Neuhengen | | 411/414 |
| 6,956,181 B2 * | 10/2005 | LeVey et al. | | 219/69.17 |
| 6,957,557 B2 * | 10/2005 | LeVey | | 72/88 |
| 7,090,453 B2 * | 8/2006 | Lin | | 411/387.1 |
| 7,255,523 B2 * | 8/2007 | Laan | | 411/411 |
| 7,731,466 B2 * | 6/2010 | Shea et al. | | 411/366.3 |
| 2006/0140738 A1 * | 6/2006 | Lin | | 411/186 |
| 2007/0009340 A1 * | 1/2007 | Van Cor | | 411/426 |
| 2007/0036634 A1 * | 2/2007 | Lung | | 411/412 |

* cited by examiner

*Primary Examiner* — Roberta Delisle
(74) *Attorney, Agent, or Firm* — Cantor Colburn LLP

(57) ABSTRACT

A screw anchor includes a body having a head end that extends to a tip end through an intermediate portion defining an axis of the screw anchor, and a plurality of threads extending along the intermediate portion. Each of the plurality of threads includes a head side surface having a first angle relative to an axis perpendicular to the axis of the screw, and a tip side surface having a second angle relative to the axis perpendicular to the axis of the screw. The first angle is between about 30° and about 40°, and the second angle is between about 15° and about 25°.

20 Claims, 1 Drawing Sheet

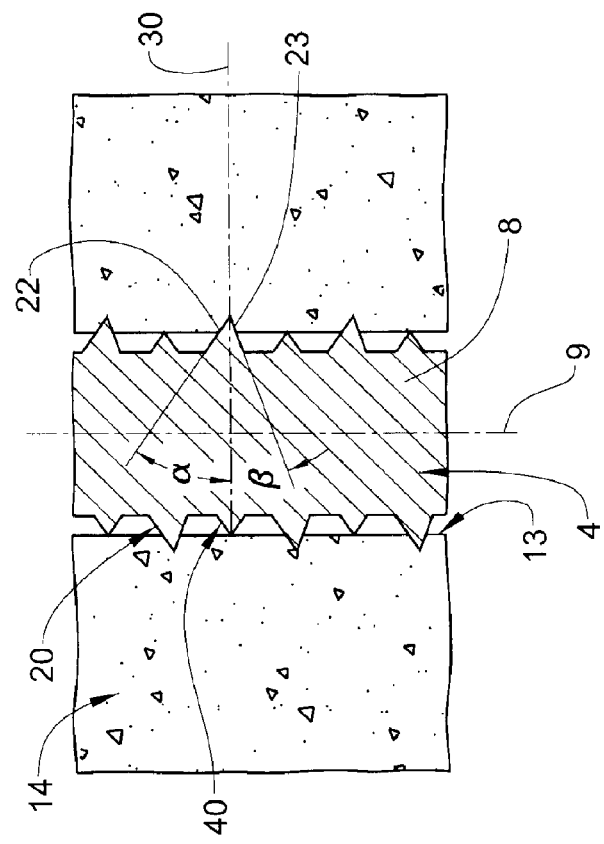
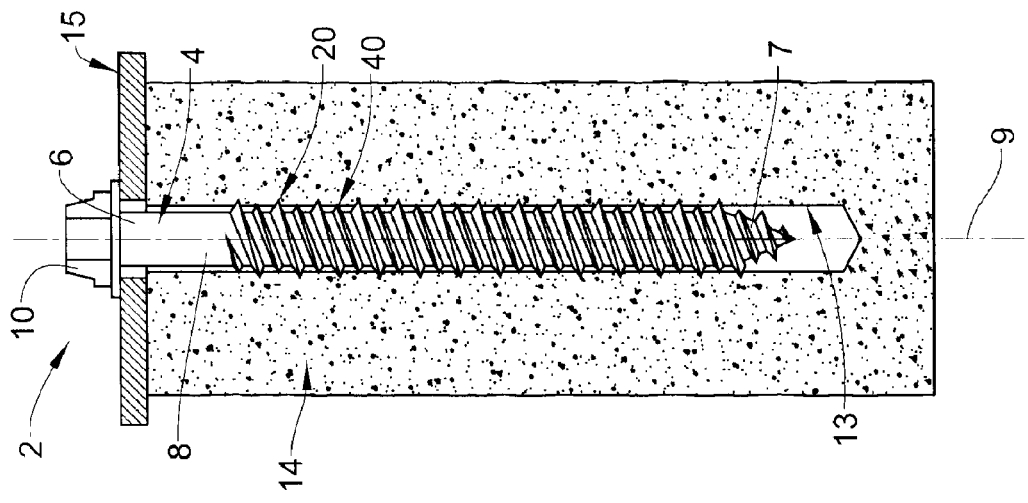

CONCRETE AND MASONRY SCREW ANCHOR

BACKGROUND

The subject matter disclosed herein relates to the art of mechanical anchors and, more particularly, to a screw anchor for attaching objects or structures to a concrete base material.

Mechanical fasteners for securing objects to a base material such a concrete, brick, block, and the like are available in a wide variety of sizes and thread profiles. Conventional anchor screws include both symmetric and asymmetric thread profiles. Symmetric thread profiles include thread forms having a sharp apex defined by an upper angled surface that is identical to a lower angled surface. Asymmetrical thread profiles include thread forms having a sharp apex defined by an upper angled surface that is dissimilar to a lower angled surface. One such type of asymmetrical thread profile is a buttress thread. In a buttress thread, load bearing thread faces are perpendicular to the axis of the screw. Buttress threads enable fasteners to withstand very high axial thrusts in one direction. However, when used in substrates having relatively low tensile strength properties such as concrete, brick, and block, buttress threads are less effective.

SUMMARY

In accordance with an exemplary embodiment, a screw anchor includes a body having a head end that extends to a tip end through an intermediate portion defining an axis of the screw anchor, and a plurality of threads extending along the intermediate portion. Each of the plurality of threads includes a head side surface having a first angle relative to an axis perpendicular to the axis of the screw, and a tip side surface having a second angle relative to the axis perpendicular to the axis of the screw. The first angle is between about 30° and about 40°, and the second angle is between about 15° and about 25°.

In accordance with another exemplary embodiment, a method of forming a screw anchor includes forming a screw body having a head end that extends to a tip end through an intermediate portion that defines an axis of the screw anchor, creating a plurality of threads along the intermediate portion. Each of the plurality of threads includes a head side surface and a tip side surface. The method also includes forming the head side surface to a first angle between about 30° and about 40° relative to an axis perpendicular to the axis of the screw, and forming the tip side surface to a second angle between about 15° and about 25° relative to the axis perpendicular to the axis of the screw.

BRIEF DESCRIPTION OF THE DRAWINGS

The following descriptions should not be considered limiting in any way. With reference to the accompanying drawings, wherein like reference numbers identify corresponding components in the respective views in which:

FIG. 1 is a side view of an anchor screw including a thread profile in accordance with an exemplary embodiment embedded in a concrete substrate; and FIG. 2 is a cross-sectional side view of the anchor screw of FIG. 1 illustrating the thread profile in accordance with an exemplary embodiment.

DETAILED DESCRIPTION

A detailed description of the hereinafter described embodiments of the disclosed apparatus and method are presented herein by way of exemplification and not limitation with reference to the Figures.

Referring to FIG. 1, a screw anchor constructed in accordance with an exemplary embodiment is indicated generally at 2. Screw anchor 2 includes a body 4 having a head end 6 that extends to a tip end 7 through an intermediate portion 8. In accordance with one aspect, screw anchor 2 is formed from a case hardened low carbon steel. For example, screw anchor 2 is formed from a low carbon steel between about an ANSI (American National Standards Institute) 1016 steel and about an ANSI 1030 steel. In accordance with another aspect, screw anchor 2 is formed from stainless steel. In the embodiment shown, intermediate portion 8 defines a longitudinal axis 9 of screw anchor 2. Also in the embodiment shown, screw anchor 2 includes a hexagonal head 10 arranged at head end 6. While head 10 is shown to be configured to receive a Phillips bit (not shown), it should be understood that head 10 can be formed in a wide variety of configurations, such as, a slotted configuration, internal hex, star shaped, and the like. Screw anchor 2 is utilized to attach objects or structures to a base material. In the exemplary configuration shown in FIG. 1, screw anchor 2 is threaded into a hole 13 formed in a concrete base material 14 to retain a plate 15. Of course it should be understood that screw anchor 2 can be employed in a wide range of applications, including securing objects to concrete, block, brick and other masonry substrates.

In order to ensure a positive engagement between screw anchor 2 and concrete base material 14, body 4 includes a plurality of threads 20 that extend along intermediate portion 8. In accordance with an aspect of an exemplary embodiment, plurality of threads 20 extend all the way up to tip end 7. By extending the plurality of threads 20 all the way to tip end 7, screw anchor 2 not only engages with concrete base material 14, but also readily penetrates any substrate such as wood and/or aluminum that lies beyond, such as sheathing, studs and the like. Each of the plurality of threads 20 includes a head side surface 22 and a tip side surface 23. As best shown in FIG. 2, head side surface 22 is at an angle α relative to an orthogonal axis 30 that extends perpendicularly to longitudinal axis 9. Conversely, tip side surface 23 is at an angle β relative to orthogonal axis 30. In accordance with an exemplary embodiment, angle α is between about 30° and about 40°, while angle β is between about 15° and about 25°. In accordance with one aspect of the exemplary embodiment, angle α is about 35°. In accordance with another aspect of the exemplary embodiment, angle β is about 20°. In accordance with yet another aspect of the exemplary embodiment, angle α is about 10° greater than angle β.

With this arrangement, the configuration of angle α and angle β creates a wedge between the plurality of threads 20 and concrete base material 14. The wedge takes advantage of the compressive strength properties of concrete base material 14 to ensure a more robust engagement between the plurality of threads 20 and concrete base material 14. In addition to creating a wedge, the configuration of angle α and angle β on the plurality of threads 20 reduces torque required to seat screw anchor 2 in concrete base material 14. By reducing torque, concrete displaced when screw anchor 2 is driven into concrete base material 14 is also reduced. By reducing the amount of concrete displaced, screw anchor 2 provides enhanced pull out resistance. In addition to the plurality of threads 20, screw anchor 2 includes a plurality of centering threads 40. Centering threads 40 help keep body 4 centered within hole 13 when screw anchor 2 is driven into concrete base material 14. In addition, by extending threads 20 all the way to tip end 7, anchor screw 2 is not only suitable for attaching objects to a substrate formed from concrete and/or other masonry, but can also penetrate material that lies beyond the concrete and/or masonry substrate so as to reduce pull out stresses.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

The invention claimed is:

1. A screw anchor comprising:
a body including a head end that extends to a tip end through an intermediate portion defining an axis of the screw anchor; and
a plurality of threads extending along the intermediate portion, each of the plurality of threads including a head side surface having a first angle relative to an axis perpendicular to the axis of the screw, and a tip side surface having a second angle relative to the axis perpendicular to the axis of the screw, the first angle being between about 30° and about 40°, and the second angle being between about 15° and about 25°, wherein the first angle extends from the head end to the tip end and the second angle extends from the head end to the tip end.

2. The screw anchor according to claim 1, wherein the first angle is about 35°.

3. The screw anchor according to claim 1, wherein the second angle is about 20°.

4. The screw anchor according to claim 1, wherein the first angle is at least 10° larger than the second angle.

5. The screw anchor according to claim 4, wherein the first angle is about 15° larger than the second angle.

6. The screw anchor according to claim 1, further comprising: a centering thread extending about the intermediate portion adjacent the plurality of threads.

7. The screw anchor according to claim 1, wherein the plurality of threads extend along the intermediate portion up to the tip end.

8. A method of forming a screw anchor, the method comprising:
forming a screw body having a head end that extends to a tip end through an intermediate portion that defines an axis of the screw anchor;
creating a plurality of threads along the intermediate portion that extends from the head end to the tip end, each of the plurality of threads including a head side surface and a tip side surface;
forming the head side surface to a first angle between about 30° and about 40° relative to an axis perpendicular to the axis of the screw; and
forming the tip side surface to a second angle between about 15° and about 25° relative to the axis perpendicular to the axis of the screw.

9. The method of claim 8, wherein the first angle is formed to about 35°.

10. The method of claim 8, wherein the second angle is formed to about 20°.

11. The method of claim 10, wherein the first angle is formed to be about 15° larger than the second angle.

12. The method of claim 8, wherein the first angle is formed to be at least 10° larger than the second angle.

13. The method of claim 8, further comprising: forming a centering thread extending about the intermediate portion adjacent the plurality of threads.

14. The method of claim 8, further comprising: forming the plurality of threads along the intermediate portion up to the tip end.

15. A concrete and masonry screw anchor comprising:
a body including a head end that extends to a tip end through an intermediate portion; and
a plurality of threads extending along the intermediate portion from the head end up to the tip end, the concrete anchor screw being configured and disposed to attach objects to a concrete base material and penetrate wood that lies beyond the concrete base material, the plurality of threads having a head side surface including a first angle and a tip side surface including a second angle, the second angle being distinct from the first angle.

16. The concrete and masonry screw anchor according to claim 15, further comprising: a centering thread extending about the intermediate portion adjacent the plurality of threads.

17. The concrete and masonry screw anchor according to claim 15, wherein the body is formed from a case hardened low carbon steel.

18. The concrete screw anchor according to claim 17, wherein the low carbon steel is between about an ANSI (American National Standards Institute) 1016 steel and about an ANSI 1030 steel.

19. The concrete and masonry screw anchor according to claim 18, wherein the low carbon steel is about an ANSI 1022 steel.

20. The concrete and masonry screw anchor according to claim 15, wherein the body is formed from stainless steel.

* * * * *